(12) United States Patent
Kleman et al.

(10) Patent No.: US 10,190,806 B2
(45) Date of Patent: Jan. 29, 2019

(54) APPARATUS AND METHODS FOR CONTROLLING AN ELECTRONIC EXPANSION VALVE IN A REFRIGERANT CIRCUIT

(71) Applicant: Rheem Manufacturing Company, Atlanta, GA (US)

(72) Inventors: Kelvin W. Kleman, Fort Smith, AR (US); Randy R. Koivisto, Fort Smith, AR (US); Jeremy Lee Babb, Fort Smith, AR (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 0 days.

(21) Appl. No.: 15/868,807

(22) Filed: Jan. 11, 2018

(65) Prior Publication Data

US 2018/0128526 A1    May 10, 2018

Related U.S. Application Data

(62) Division of application No. 13/861,188, filed on Apr. 11, 2013, now Pat. No. 9,874,380.
(Continued)

(51) Int. Cl.
*F25B 41/06* (2006.01)
*F25B 41/04* (2006.01)
(Continued)

(52) U.S. Cl.
CPC .......... *F25B 41/043* (2013.01); *F25B 41/062* (2013.01); *F25B 49/00* (2013.01);
(Continued)

(58) Field of Classification Search
CPC ...... F25B 2313/0314; F25B 2341/0653; F25B 2600/2513; F25B 2700/21174; F25B 2700/21175
See application file for complete search history.

(56) References Cited

U.S. PATENT DOCUMENTS

| 4,879,879 A | 11/1989 | Marsala et al. |
| 5,035,119 A | 7/1991 | Alsenz |

(Continued)

FOREIGN PATENT DOCUMENTS

| EP | 147356 | 7/1985 |
| EP | 147357 | 7/1985 |
| WO | WO 9732168 | 9/1997 |

OTHER PUBLICATIONS

Office Action issued for Canadian Application No. 2,820,316, dated Jan. 22, 2015, 5 pgs.

*Primary Examiner* — Jonathan Bradford (74) *Attorney, Agent, or Firm* — King & Spalding LLP (57) ABSTRACT

A specially designed electronic expansion valve control system is provided for use with a refrigerant-based air conditioning circuit having a compressor, a condenser coil, an electronic expansion valve and an evaporator coil fluid coupled in series. The control system includes a unit control and an expansion valve control. The unit control is operative to receive compressor operation-related signal information and responsively generate at least one output signal representative of the received compressor operation-related signal information. The expansion valve control is operative to receive from the unit control only the at least one output signal, and to receive from one of the coils coil operation-related signal information, and to responsively output a control useable to control the expansion valve, the control signal being related in a predetermined manner to the signals received by the expansion valve control.

14 Claims, 6 Drawing Sheets

Related U.S. Application Data (60) Provisional application No. 61/663,960, filed on Jun. 25, 2012.

(51) Int. Cl.
  *F25B 49/00* (2006.01)
  *F25D 13/00* (2006.01)
  *F25B 1/10* (2006.01)

(52) U.S. Cl.
  CPC ............... *F25D 13/00* (2013.01); *F25B 1/10* (2013.01); *F25B 2313/02741* (2013.01); *F25B 2313/0314* (2013.01); *F25B 2600/23* (2013.01); *F25B 2600/2513* (2013.01)

(56) References Cited

U.S. PATENT DOCUMENTS

| | | |
|---|---|---|
| 5,077,983 A | 1/1992 | Dudley |
| 5,289,692 A | 3/1994 | Campbell et al. |
| 5,426,952 A | 6/1995 | Bessler |
| 5,546,757 A | 8/1996 | Whipple, III |
| 5,628,201 A | 5/1997 | Bahel |
| 5,737,931 A * | 4/1998 | Ueno ............... F25B 9/006 62/126 |
| 5,771,703 A | 6/1998 | Rajendran |
| 5,987,907 A | 11/1999 | Morimoto |
| 6,017,192 A | 1/2000 | Clack |
| 7,762,094 B2 | 7/2010 | Iwaki et al. |
| 2009/0045264 A1 | 2/2009 | Lou |
| 2009/0314484 A1 | 12/2009 | Barrett |
| 2010/0000245 A1 | 1/2010 | Kasahara et al. |

* cited by examiner

Fig. 2

| OPERATING MODE | EVAPORATOR COIL INLET (1) | EVAPORATOR COIL OUTLET / SUCTION (2) | COMPRESSOR DISCHARGE (3) |
|---|---|---|---|
| COOLING MODE | 35 - 55° F | 45 - 65° F | 110 - 220° F |
| HEATING MODE | -5 - 60° F | 5 - 70° F | 145 - 180° F |

APPARATUS AND METHODS FOR CONTROLLING AN ELECTRONIC EXPANSION VALVE IN A REFRIGERANT CIRCUIT

CROSS-REFERENCE TO RELATED APPLICATION

The present application is a divisional application of and claims priority to U.S. patent application Ser. No. 13/861,188, filed Apr. 11, 2013, and titled "Apparatus And Methods For Controlling An Electronic Expansion Valve In A Refrigerant Circuit," which claims the benefit of the filing date of provisional U.S. patent application No. 61/663,960 filed Jun. 25, 2012. The entire contents of these applications are hereby incorporated herein by this reference.

BACKGROUND OF THE INVENTION

The present invention relates generally to refrigerant circuit control apparatus and methods, and, in a representatively illustrated embodiment thereof, more particularly provides specially designed apparatus and methods for controlling an electronic expansion valve in a heat pump refrigerant circuit.

In previously proposed control systems for controlling an electronic expansion valve in a refrigerant circuit, it was necessary to transmit multiple output signals from a unit control to an expansion valve control, such multiple output signals representing a variety of system and component operating characteristics representatively including (1) a first stage compressor operation signal, (2) a second stage compressor operation signal, (3) a heat pump heating mode signal (as determined by a reversing valve position signal), (4) a heat pump cooling mode signal (as determined by a reversing valve position signal), and (5) a defrost mode signal. Multiple corresponding operational characteristic and mode inputs of various types also had to be constructed and connected to the unit control. These previous necessities undesirably increased the complexity and cost of the unit control and thus the overall complexity of the overall air conditioning system, due to the additional structure and signal generating capability required to be incorporated in the unit control.

As can be readily seen from the foregoing, a need exists for simpler, less complex, and less expensive apparatus and methods for controlling an electronic expansion valve in an air conditioning system such as a heat pump system.

DETAILED DESCRIPTION

Figure 1:
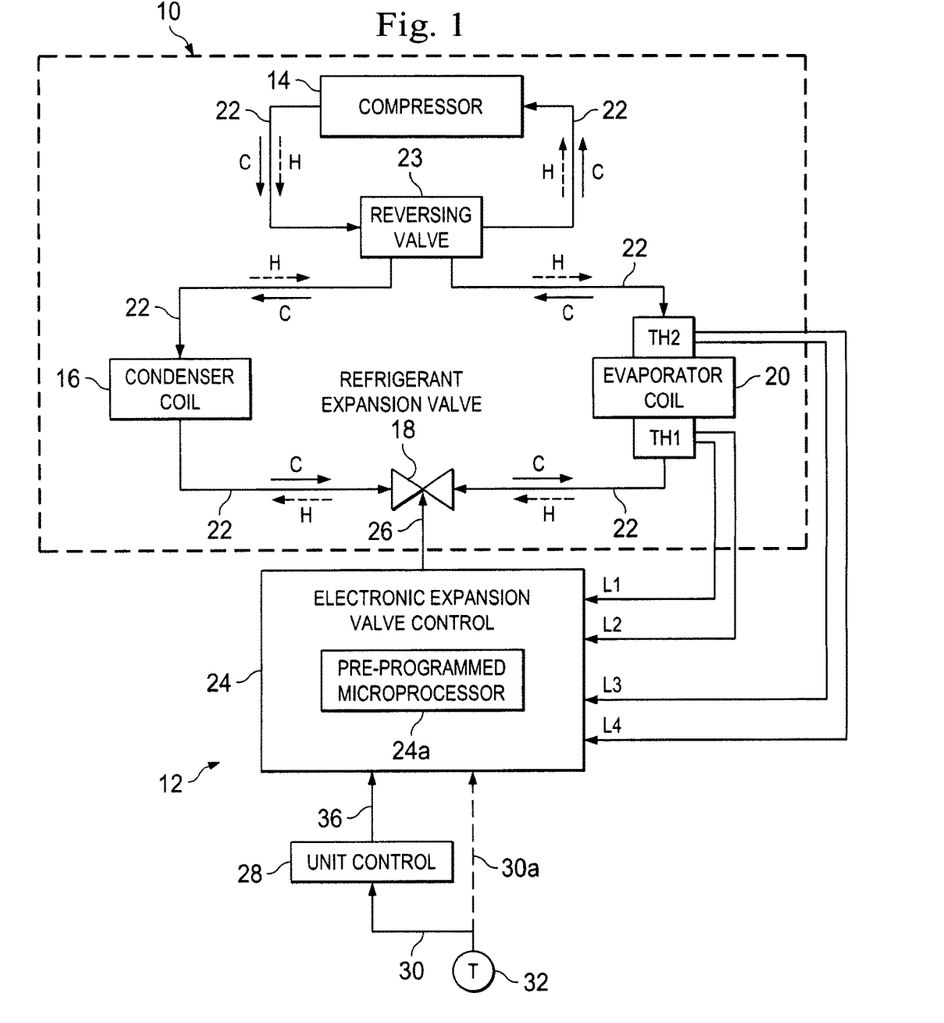
FIG. 1 is a schematic diagram of a heat pump refrigerant circuit having therein an electronic expansion valve (EEV) controlled by a specially designed control system embodying principles of the present invention.

Schematically depicted in FIG. 1 is a refrigerant-based air conditioning system 10 having an associated control system 12 embodying principles of the present invention. System 10 is representatively a heat pump system having heating, cooling and defrost modes, but (without a subsequently referenced reversing valve portion) could alternatively be a cooling-only system, and includes a compressor 14, a condenser coil 16, an electronic expansion valve (EEV) 18 and an evaporator coil 20 interconnected in series as shown in by a refrigerant line 22 in which a schematically depicted reversing valve 23 is also operatively connected.

With the system 10 in its cooling mode the reversing valve 23 in a first position thereof causes the refrigerant to be routed from the compressor 14, as indicated by the solid line flow arrows C, sequentially through the condenser coil 16, the expansion valve 18, the evaporator coil 20 and then back to the compressor 14. With the reversing valve 23 in a second position thereof and the system 10 in its heating mode, the refrigerant is routed from the compressor 14, as indicated by the dashed line flow arrows H, sequentially through the evaporator coil 20, the expansion valve 18, the condenser coil 16 and then back to the compressor 14.

The control system 12 includes (1) an electronic expansion valve control 24, incorporating therein a pre-programmed microprocessor 24a, operative to output a system operational mode control signal 26 to the valve 18 to position it to optimally control the system superheat and thus the performance of the system 10 in both heating and cooling modes, and (2) a unit control 28 that receives a system operation request 30, from a room thermostat 32 located in a conditioned space served by the system 10, and responsively outputs a single digital control signal 36 to the electronic expansion valve control 24. The single digital signal 36 is indicative of the run state (i.e., "on" or "off") of the compressor 14. In addition to uniquely generating the single digital signal 36 which transmits compressor operation-related signal information to the electronic expansion valve control 24, the unit control 28 is conventionally operative to generate other system control signals which are not illustrated herein and are not pertinent to the present invention.

As an alternative to the signal 36 being transmitted from the unit control 28 to the electronic expansion valve control 24, the signal 36 can be eliminated and replaced with an operation request signal 30a sent to the electronic expansion valve control 24 (in addition to the thermostat signal 30 sent to the unit control 28) and transmitting similar compressor operation-related signal information to the electronic expansion valve control 24.

Via electrical lead pairs L1,L2 and L3,L4 from thermistors TH1,TH2 respectively sensing evaporator coil refrigerant inlet and outlet temperatures (when the system 10 is in its cooling mode), the valve control 24 also receives evaporator coil operational temperature signals. Using the signals from the evaporator coil 20 and the single digital signal 36 from the unit control 28, the valve control 24 (via the microprocessor 24a) determines the mode of operation of the system 10 (for example, cooling, heating or defrost mode of the heat pump) and responsively adjusts the operational mode control signal 26 output to the expansion valve 18 to appropriately position and/or modulate the expansion valve 18 as determined by the microprocessor 24a. Both the coil temperature signals transmitted to the valve control 24 via leads L1-L4 and the operation request signals 30,30a from the thermostat 32 may be generally referred to herein as "compressor operation-related signal information".

While the illustrated expansion valve control technique is illustrated utilized in conjunction with a heat pump system, it could also be implemented in conjunction with a cooling-only refrigerant circuit (i.e., one without the illustrated reversing valve 23). Preferably, as just described, the coil inlet and outlet temperatures transmitted to the electronic expansion valve control 24 are those of the evaporator (indoor) coil 20. However, as will be readily appreciated by those of skill in this particular art, such coil inlet and outlet temperatures could alternatively be those of the condenser (outdoor) coil 16.

In various previously proposed electronic expansion valve control systems, multiple output signals were transmitted from a unit control to an expansion valve control and typically included (1) a first stage compressor operation signal, (2) a second stage compressor operation signal, (3) a heat pump heating mode signal (as determined by a reversing valve position signal), (4) a heat pump cooling mode signal (as determined by a reversing valve position signal), and (5) a defrost mode signal. This undesirably increased the cost and complexity of the unit control due to the additional structure and signal generating capability it required.

As illustrated in the representative embodiment of the control system 12 shown in FIG. 1, only a single digital output signal (signal 36) is needed from the unit control 28, with the signal 36 representing only compressor operational characteristic information (representatively compressor run/off state information). All of the other input signals (the previously described temperature signals from the evaporator coil 20) and their necessary hardware are already available, with such signals being sent from the coil 20 to the valve control 24 instead of to the unit control 28, thereby permitting the unit control 28 to be appreciably less complex and expensive.

Figure 2:
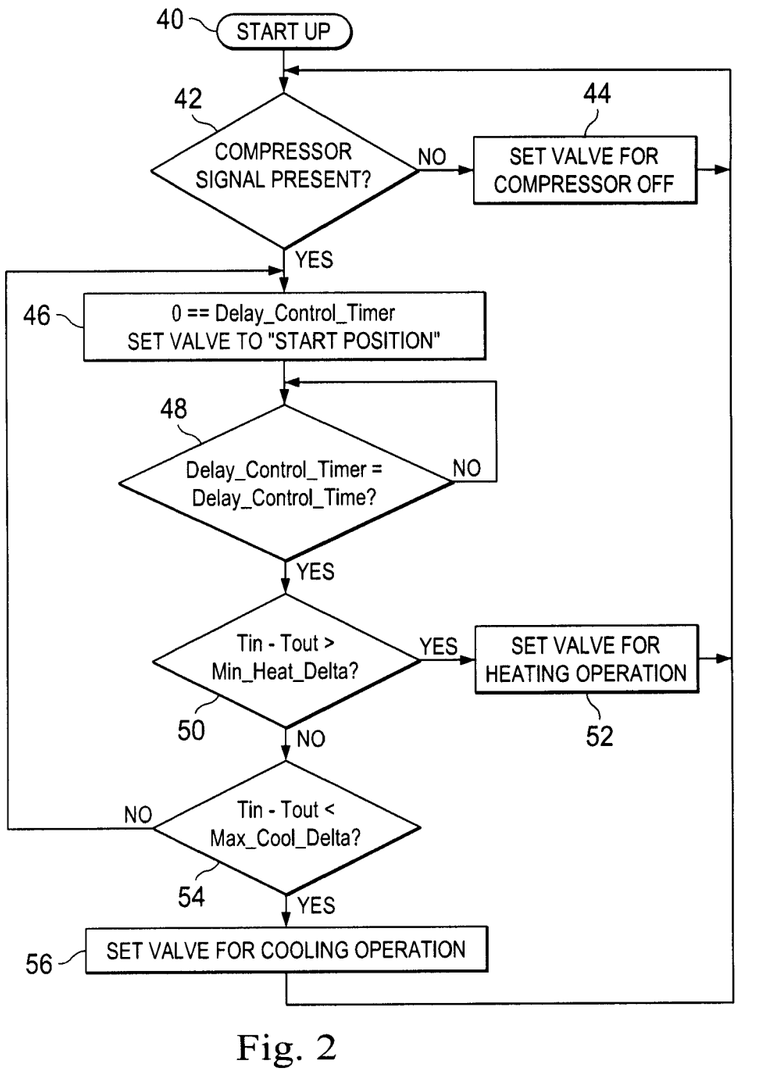
FIG. 2 is a schematic flow diagram illustrating the operation of the control system utilizing a sensed coil temperature differential to set the EEV to heating or cooling operation.

Turning now to the flow chart of FIG. 2, the operation of the electronic expansion valve control system 12 will be more fully described. A listing of the definitions of the parameters referenced in the flow chart is set forth below:

$T_{in}$=value of a temperature sensor on the input of the coil 20

$T_{out}$=value of a temperature sensor on the output of the coil 20

Delay_Control_Time=a variable time to delay

Min_Heat_Delta=a variable defining minimum temperature delta across coil 20 expected during heating operation Max_Cool_Delta=a variable defining maximum temperature delta across coil 20 expected during cooling operation Upon start-up of the electronic expansion valve control system 12 at step 40, a query is made at step 42 as to whether the compressor 14 is active (as indicated by the unit control output signal 36 in FIG. 1). If the compressor 14 is not active a transfer is made to step 44 at which the expansion valve 18 is set for a compressor-off state and the system cycles at step 42 until the compressor 14 is activated, at which point a transfer is made from step 42 to step 46. At step 46 the value of a delay control timer is set to zero.

Next, a transfer is made from step 46 to step 48 at which a query is made as to whether the time on a delay control timer is equal to the predetermined delay control time. If it is not, the system cycles at step 48 until it is, at which point a transfer is made from step 48 to step 50. At step 50 a query is made as to whether the value of $T_{in}-T_{out}$ is greater that of Min_Heat_Delta. If it is, a transfer is made from step 50 to step 52 at which the expansion valve 18, via the control signal 26 from the valve control 24, is appropriately set for heating operation of the cooling system 10. A transfer is then made back to step 42.

If at step 50 $T_{in}-T_{out}$ is not greater than Min_Heat_Delta, a transfer is made from step 50 to step 54 at which a query is made as to whether $T_{in}-T_{out}$ is less than Max_Cool_Delta. If it is not, a transfer is made from step 54 back to step 46. If it is, a transfer is made from step 54 to step 56 at which the expansion valve 18, via the control signal 26 from the valve control 24, is appropriately set for cooling operation of the system 10. A transfer is then made from step 56 back to step 42. If the answer to the query at step 50 is positive, a transfer is made from step 50 to step 52 at which the expansion valve is set to its heating mode.

As previously mentioned, the illustrated air conditioning system 10 is representatively a heat pump system capable of both cooling and heating a conditioned space, but could alternatively be a cooling-only system. The same control logic of FIG. 2 could also be utilized in conjunction with such cooling-only system. However, step 52 in the FIG. 2 flow chart would not come into play since this alternative system would not have a heating capability.

Figure 5:
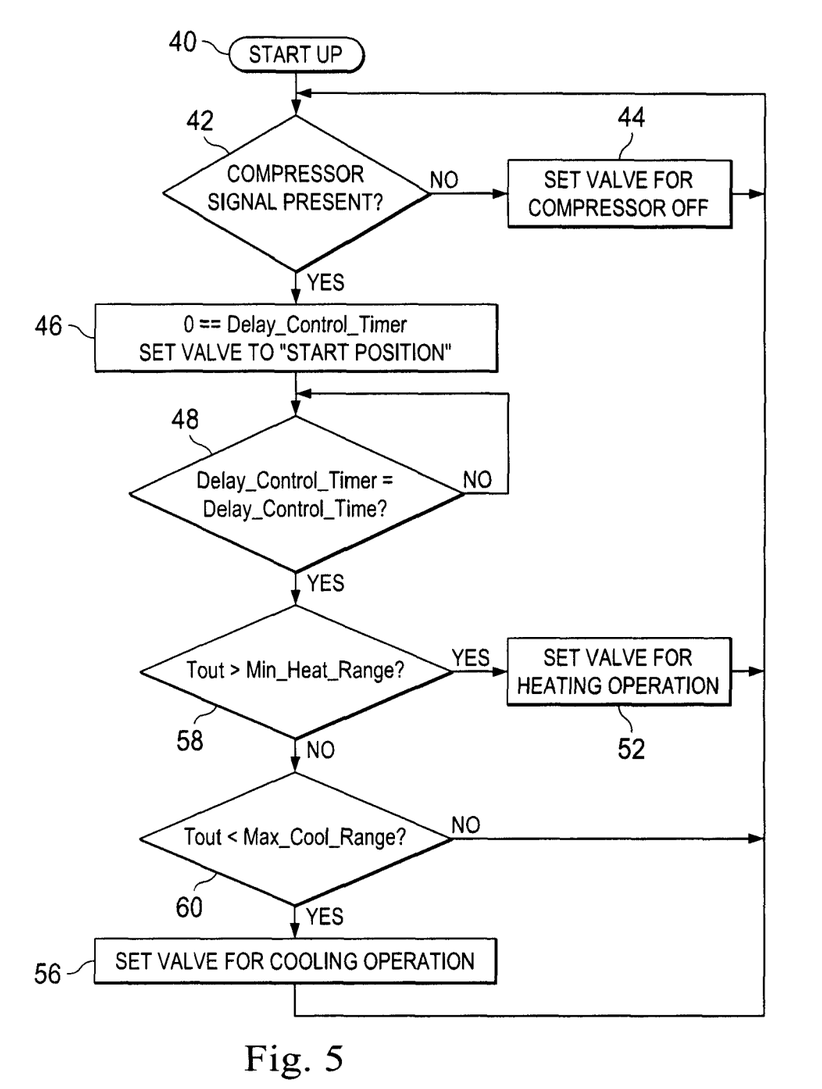
FIG. 5 is a schematic flow diagram illustrating an optional operation of the control system utilizing the coil outlet temperature to set the EEV to heating or cooling operation.

Turning now to the flow chart of FIG. 5 showing an alternate control scheme to that described in FIG. 2, the operation of the electronic expansion valve control system 12 will be more fully described. Steps in the FIG. 5 flow chart identical to those in the FIG. 2 flow chart have been given the same reference numbers. A listing of the definitions of the parameters referenced in the FIG. 5 flow chart is set forth below:

$T_{out}$=value of a temperature sensor on the outlet of the coil 20

Delay_Control_Time=a variable time to delay

Min_Heat_Range=a variable defining minimum expected temperature value at the outlet of coil 20 during heating operation Max_Cool_Range=a variable defining maximum expected temperature value at the outlet of coil 20 during cooling operation Upon start-up of the FIG. 5 electronic expansion valve control system, at step 40, a query is made at step 42 as to whether the compressor 14 is active (as indicated by the unit control output signal 36 in FIG. 1). If the compressor 14 is not active a transfer is made to step 44 at which the expansion valve 18 is set for a compressor-off state and the system cycles at step 42 until the compressor 14 is activated, at which point a transfer is made from step 42 to step 46. At step 46 the value of a delay control timer is set to zero.

Next, a transfer is made from step 46 to step 48 at which a query is made as to whether the time on a delay control timer is equal to the predetermined delay control time. If it is not, the system cycles at step 48 until it is, at which point a transfer is made from step 48 to step 58. At step 58 a query is made as to whether the value of $T_{out}$ is greater that of Min_Heat_Range. If it is, a transfer is made from step 58 to step 52 at which the expansion valve 18, via the control signal 26 from the valve control 24, is appropriately set for heating operation of the system 10. A transfer is then made back to step 42.

If at step 58 $T_{out}$ is not greater than Min_Heat_Range, a transfer is made from step 58 to step 60 at which a query is made as to whether $T_{out}$ is less than Max_Cool_Range. If it is not, a transfer is made from step 60 back to step 42. If it is, a transfer is made from step 60 to step 56 at which the expansion valve 18, via the control signal 26 from the valve control 24, is appropriately set for cooling operation of the system 10. A transfer is then made from step 56 back to step 42.

As previously mentioned, the illustrated air conditioning system 10 is representatively a heat pump system capable of both cooling and heating a conditioned space, but could alternatively be a cooling-only system. The same control logic of FIG. 5 could also be utilized in conjunction with such cooling-only system. However, step 52 in the FIG. 5 flow chart would not come into play since this alternative system would not have a heating capability.

Figure 6:
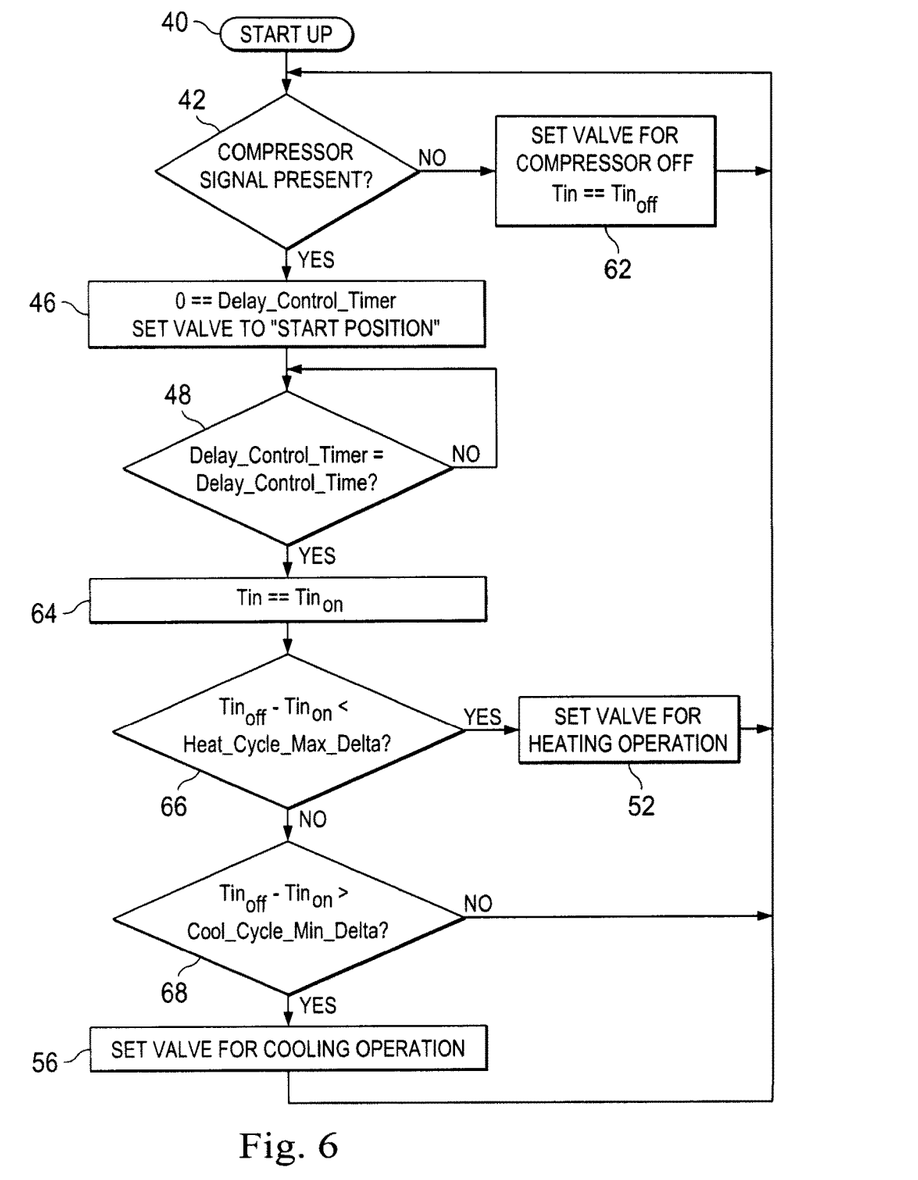
FIG. 6 is a schematic flow diagram illustrating an optional operation of the control system utilizing the coil inlet temperature rise when compared to an off time reference coil saturation temperature to set the EEV to heating or cooling operation.

Turning now to the flow chart of FIG. 6 showing an alternate control scheme to that described in FIG. 2 or 5, the operation of the electronic expansion valve control system 12 will be more fully described. Steps in the FIG. 6 flow chart identical to those in the FIG. 2 flow chart have been given the same reference numerals. A listing of the definitions of the parameters referenced in the flow chart is set forth below:

$T_{in}$=Value of a temperature sensor on the input of evaporator coil 20

$T_{inoff}$=Temperature on the input of the coil with system in off state $T_{inon}$=Temperature on the input of the coil with system in on state Delay_Control_Time=a variable time to delay Heat_Cycle_Max_Delta=A variable that defines the maximum temperature differential expected during heating operation across coil 20.

Cool_Cycle_Min_Delta=a variable defining minimum temperature differential expected during cooling operation across coil 20.

Upon start-up of the FIG. 6 electronic expansion valve control system, at step 40, a query is made at step 42 as to whether the compressor 14 is active (as indicated by the unit control output signal 36 in FIG. 1). If the compressor 14 is not active a transfer is made to step 62 at which the expansion valve 18 is set for a compressor-off state, the Tinoff variable is set equal to Tin measured value, and the system cycles at step 42 until the compressor 14 is activated, at which point a transfer is made from step 42 to step 46. At step 46 the value of a delay control timer is set to zero.

Next, a transfer is made from step 46 to step 48 at which a query is made as to whether the time on a delay control timer is equal to the predetermined delay control time. If it is not, the system cycles at step 48 until it is, at which point a transfer is made from step 48 to step 64. At step 64 the $T_{inon}$ variable is set equal to $T_{in}$ and a transfer is made from step 64 to step 66. At step 66 a query is made as to whether the value of $T_{inoff}-T_{inon}$ is less than that of Heat_Cycle_Max_Delta. If it is, a transfer is made from step 66 to step 52 at which the expansion valve 18, via the control signal 26 from the valve control 24, is appropriately set for heating operation of the cooling system 10. A transfer is then made back to step 42.

If at step 66 $T_{inoff}-T_{inon}$ is greater than Heat_Cycle_Max_Delta, a transfer is made from step 66 to step 68 at which a query is made as to whether $T_{inoff}-T_{inon}$ is greater than Cool_Cycle_Min_Delta. If it is not, a transfer is made from step 68 back to step 42. If it is, a transfer is made from step 68 to step 56 at which the expansion valve 18, via the control signal 26 from the valve control 24, is appropriately set for cooling operation of the system 10. A transfer is then made from step 56 back to step 42.

As previously mentioned, the illustrated air conditioning system 10 is representatively a heat pump system capable of both cooling and heating a conditioned space, but could alternatively be a cooling-only system. The same control logic of FIG. 6 could also be utilized in conjunction with such cooling-only system. However, step 52 in the FIG. 6 flow chart would not come into play since this alternative system would not have a heating capability.

Figure 7:
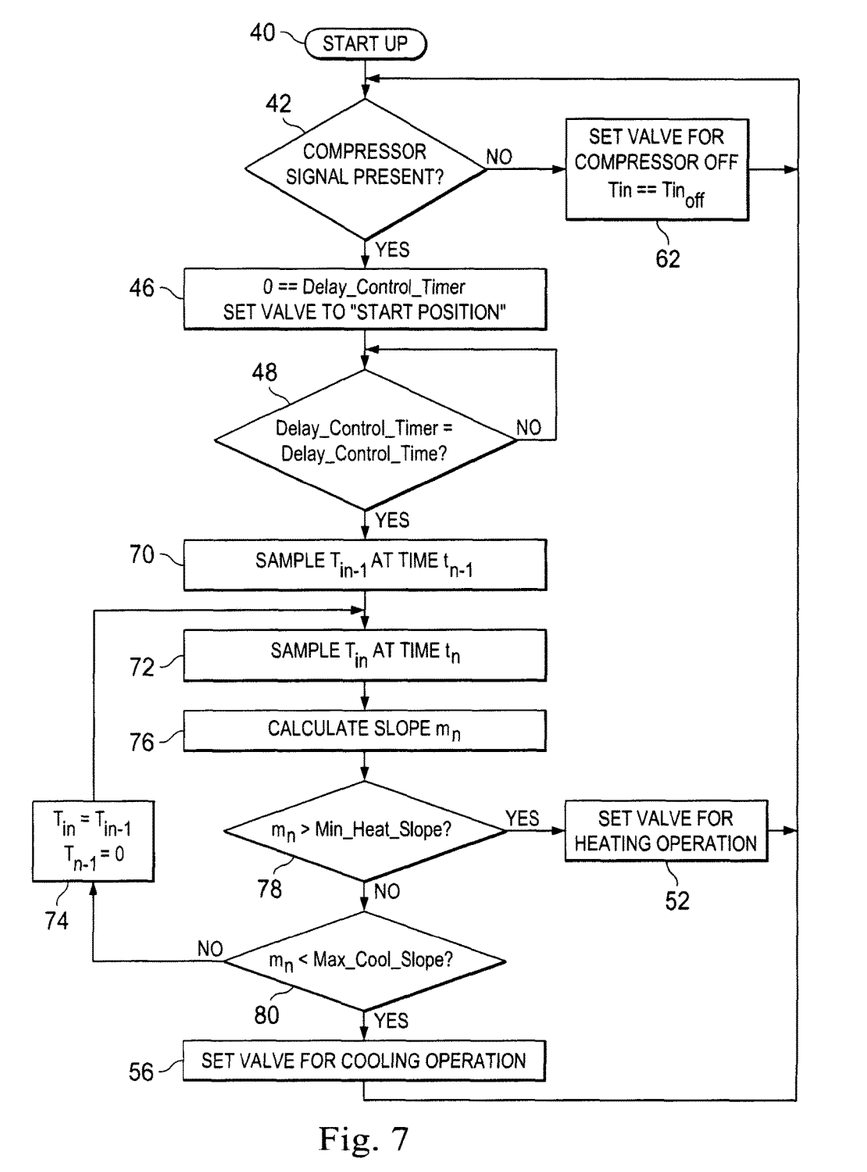
FIG. 7 is a schematic flow diagram illustrating an optional operation of the control system utilizing the coil inlet temperature rise per unit time to set the EEV to heating or cooling operation.

Turning now to the flow chart of FIG. 7 showing an alternate control scheme to that described in FIGS. 2, 5, and 6, the operation of the electronic expansion valve control system 12 will be more fully described. Steps in the FIG. 7 flow chart identical to those in the FIG. 2 flow chart have been given the same reference numerals. A listing of the definitions of the parameters referenced in the flow chart is set forth below:

$T_{in-1}$=Value of a temperature sensor on the input of the evaporator coil at time $t_{n-1}$ $T_{in}$=Value of a temperature sensor on the input of the evaporator coil at time $t_n$ $t_{n-1}$=sample time at which a compressor operation call is made as seen by the electronic expansion valve control 12 via signal 36 from the unit control 28.

$t_n$=sample time at which $T_{in}$ is taken $m_n$=The slope of the $T_{in}$ temperature change over time $t_n-t_{n-1}$ Delay_Control_Time=a variable time to delay Min_Heat_Slope=a variable that defines the minimum temperature change per unit time expected during heating operation across coil 20.

Max_Cool_Slope=a variable defining maximum temperature change per unit time expected during cooling operation across coil 20.

Upon start-up of the electronic expansion valve control system 12 at step 40, a query is made at step 42 as to whether the compressor 14 is active (as indicated by the unit control output signal 36 in FIG. 1). If the compressor 14 is not active a transfer is made to step 62 at which the expansion valve 18 is set for a compressor-off state, the $T_{inoff}$ variable is set equal to $T_{in}$ measured, and the system cycles at step 42 until the compressor 14 is activated, at which point a transfer is made from step 42 to step 46. At step 46 the value of a delay control timer is set to zero.

Next, a transfer is made from step 46 to step 48 at which a query is made as to whether the time on a delay control timer is equal to the predetermined delay control time. If it is not, the system cycles at step 48 until it is, at which point a transfer is made from step 48 to step 70. At step 70 a sample $Ti_{n-1}$ is taken at time $t_{n-1}$ stored in the electronic expansion valve control board 24 and a transfer is made to step 72. At step 72 an additional sample $T_{in}$ is taken at predetermined interval of time $t_n$ from $t_{n-1}$. A transfer is then made from step 72 to step 76 where the rate of temperature change per unit time, $t_{n-1}-t_n$, is calculated. Following the rate of temperature change calculation a transfer is made from step 76 to step 78. At step 78 a query is made as to whether the value of $m_n$ is greater than that of Min_Heat_Slope. If it is, a transfer is made from step 78 to step 52 at which the expansion valve 18, via the control signal 26 from the valve control 24, is appropriately set for heating operation of the cooling system 10. A transfer is then made back to step 42.

If at step 78 $m_n$ is less than Min_Heat_Slope, a transfer is made from step 78 to step 80 at which a query is made as to whether $m_n$ is less than Max_Cool_Slope. If it is not, a transfer is made from step 80 to step 74 where the coil temperature variable $T_{in-1}$ is set equal to the instantaneous measurement of $T_{in}$ at the evaporator coil 20 outlet 48 and the temperature variable $T_{n-1}$ is then set to 0. A transfer is then made back to step 72. If mn is less than Max_Cool_Slope, a transfer is made from step 80 to step 56 at which the expansion valve 18, via the control signal 26 from the valve control 24, is appropriately set for cooling operation of the system 10. A transfer is then made from step 56 back to step 42.

As previously mentioned, the illustrated air conditioning system 10 is representatively a heat pump system capable of both cooling and heating a conditioned space, but could alternatively be a cooling-only system. The same control logic of FIG. 7 could also be utilized in conjunction with such cooling-only system. However, step 52 in the FIG. 7 flow chart would not come into play since this alternative system would not have a heating capability.

Figure 3:
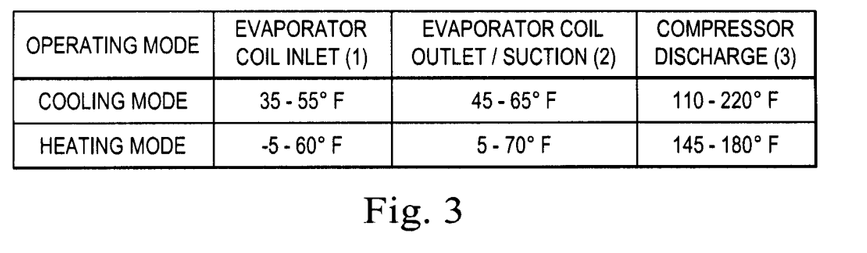
FIG. 3 is a table showing representative operating parameters of the heat pump refrigerant circuit in its cooling and heating modes.

The table shown in FIG. 3 sets forth, by way of non-limiting example, illustrative parameter values for the heating and cooling modes of the system 10—namely, representative examples of compressor outlet temperature and evaporator coil inlet and outlet temperatures in the heating and cooling modes. Such temperatures are for a representative medium temperature air conditioning type system design. The fundamental relationships among the three points will remain somewhat constant for high temperature and low temperature refrigeration, but the absolute values of the tabled points will be variable.

As can be seen from the FIG. 3 table, during the cooling mode the temperature at the inlet to the evaporator coil 20 (point 1 in the table) will be between 35-55° F. depending on the indoor and outdoor ambient loads. At this time the evaporator coil outlet/suction temperature (point 2 in the table) will be in the 45-65° F. range with a discharge temperature (point 3 in the table) in the range of 110-220° F., which is common for medium temperature air conditioning systems. In the heating mode, the evaporator inlet temperature will be in the −5-+60° F. range and the evaporator coil outlet temperature will be in the 5-70° F. range with discharge temperatures fluctuating between 145° F. and 180° F.

When the representatively illustrated heat pump system 10 is operating in a heating mode, the coil 20 will be functioning as a condenser and thus have refrigerant entering temperatures in the range of 145-180° F. The control system 12 would thus have ample difference between the discharge temperatures at point 3 in heating mode and the evaporator outlet/suction temperature during cooling mode to perform a simple relative analysis.

Therefore, with respect to the indoor coil 20, the electronic expansion valve 18 would cease to modulate/meter the refrigerant flow if the absolute value of the temperature sensed by thermistor TH2 rose to above a predefined point selected between the minimum discharge temperature in heating and the maximum evaporator coil outlet temperature in the cooling mode or vice versa for the outdoor coil 16 in the opposite modes). During this condition the expansion valve 18 would either open to a fully stroked position or remain static at the last modulated position. In either event it would be desirable, to minimize the pressure drop across the expansion valve 18 during the heating mode (with no expansion valve modulation being performed) to utilize a check valve (not shown herein) device that permits refrigerant flow to bypass the expansion valve.

Figure 4:
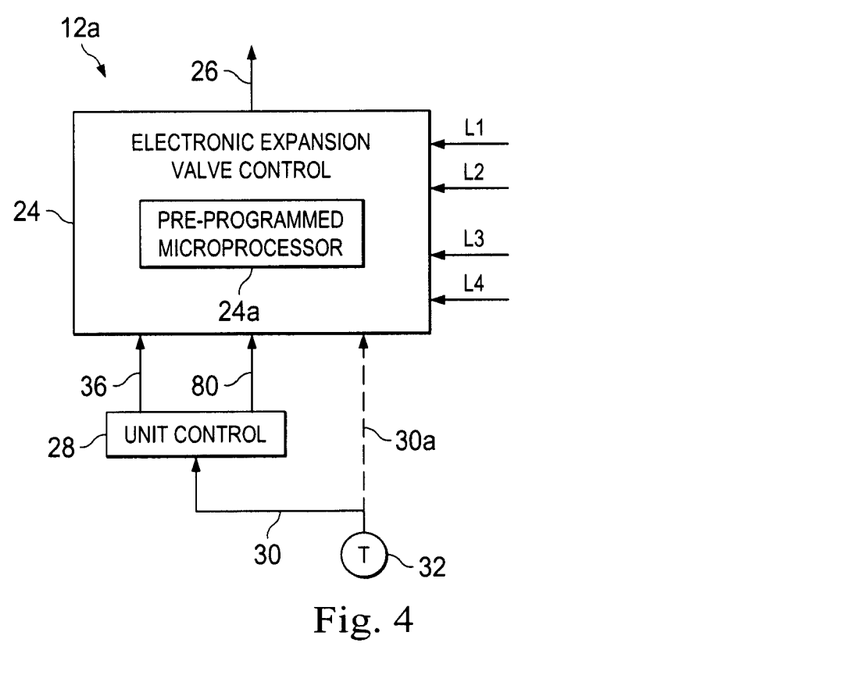
FIG. 4 is a schematic diagram of an alternate embodiment of the control system.

An alternate embodiment 12a of the previously described FIG. 1 control system 12 portion of the refrigerant-based air conditioning system 10 is schematically shown in FIG. 4. The control system 12a is identical to the control system 12 with the exceptions that in addition to the previously described compressor run state signal 36 (i.e., compressor on/off) the electronic expansion valve control 24 also receives from the unit control 28 an operating stage signal 80 (i.e., compressor first stage/second stage. Via the microprocessor 24a the output signal 26 to the electronic expansion valve 18 is controlled as a function of the signals 36,80, and the evaporator coil operational signals (transmitted via the leads L1, L2, L3 and L4) received by the electronic expansion valve control 24.

The representatively illustrated control systems 12 and 12a provide several advantages over previously proposed systems used to control an electronic expansion valve in a refrigerant-based air conditioning circuit. For example, in such previously proposed systems it was necessary to transmit multiple output signals from the unit control to the expansion valve control, such multiple output signals representing a variety of system and component operating characteristics which, as previously mentioned herein, including (1) a first stage compressor operation signal, (2) a second stage compressor operation signal, (3) a heat pump heating mode signal (as determined by a reversing valve position signal), (4) a heat pump cooling mode signal (as determined by a reversing valve position signal), and (5) a defrost mode signal. Multiple corresponding operational characteristic and mode inputs of various types also had to be constructed and connected to the unit control. These previous necessities undesirably increased the complexity and cost of the unit control, and thus the overall complexity of the overall air conditioning system, due the additional structure and signal generating capability required to be incorporated into the unit control.

In contrast, in the representatively illustrated expansion valve control systems 12 and 12a of the present invention only compressor-related information is output from the unit control 28 to the valve control 24—compressor run state information in the control system 12, and compressor run state and stage information in the control system 12a. Moreover, in each of the control systems 12 and 12a coil information (via leads L1-L4) is routed to the expansion valve control 24 instead of to the unit control 28.

The foregoing detailed description is to be clearly understood as being given by way of illustration and example only, the spirit and scope of the present invention being limited solely by the appended claims.

What is claimed is:

1. A method of controlling a refrigerant-based air conditioning circuit having a compressor, a condenser coil, an electronic expansion valve and an evaporator coil fluid coupled in series, said method comprising the steps of:
   providing an expansion valve control;
   providing a unit control;
   transmitting to said expansion valve control only signal information relating to operation of said compressor and operation of one of said condenser coil and said evaporator coil, wherein said compressor has a plurality of operational stages and wherein said step of transmitting to said expansion valve control is performed by causing said unit control to transmit to said expansion valve control only a first signal indicative of a run state of said compressor and a second signal indicative of an operational stage of the plurality of operational stages of said compressor; and controlling said electronic expansion valve by transmitting from said expansion valve control to said electronic expansion valve a control signal related in a predetermined manner to said signal information.

2. The method of claim 1, wherein said step of transmitting to said expansion valve control comprises transmitting the signal information relating to operation of one of said condenser coil and said evaporator coil from said evaporator coil.

3. The method of claim 1, wherein said signal information relating to operation of one of said condenser coil and said evaporator coil comprise the refrigerant temperature differential between the inlet and outlet of said one of said condenser coil and said evaporator coil.

4. The method of claim 1, wherein said step of transmitting to said expansion valve control comprises transmitting said signal information relating to operation of said compressor to said expansion valve control from a thermostat.

5. The method of claim 1, wherein said controlling step is performed in a manner controlling the electronic expansion valve in either a heating mode or a cooling mode in automatic response to sensed magnitudes of refrigerant temperature differentials across one of said condenser coil and said evaporator coil.

6. The method of claim 1, further comprising the step of verifying compressor operation prior to operatively controlling the electronic expansion valve.

7. The method of claim 6, further comprising the step of delaying the controlling of the electronic expansion valve until the expiration of a period of time after compressor activation.

8. A method of controlling a refrigerant-based air conditioning circuit having a compressor, a condenser coil, an electronic expansion valve and an evaporator coil fluid coupled in series, said method comprising the steps of:
    providing an expansion valve control;
    receiving, by a unit control, compressor operation-related signal information, wherein the unit control is communicably coupled to a thermostat;
    generating at least one output signal representative of the received compressor operation-related signal information, wherein the at least one output signal is indicative of a run state of said compressor;
    transmitting to said expansion valve control only signal information relating to operation of said compressor and operation of one of said condenser coil and said evaporator coil, wherein said compressor has a plurality of operational stages and wherein said step of transmitting to said expansion valve control is performed by causing said unit control to transmit to said expansion valve control only a first signal indicative of a run state of said compressor and a second signal indicative of an operational stage of the plurality of operational stages of said compressor; and
    controlling said electronic expansion valve by transmitting from said expansion valve control to said electronic expansion valve a control signal related in a predetermined manner to said signal information.

9. The method of claim 8, wherein said step of transmitting to said expansion valve control comprises transmitting the signal information relating to operation of one of said condenser coil and said evaporator coil from said evaporator coil.

10. The method of claim 8, wherein said signal information relating to operation of one of said condenser coil and said evaporator coil comprise the refrigerant temperature differential between the inlet and outlet of said one of said condenser coil and said evaporator coil.

11. The method of claim 8, wherein said step of transmitting to said expansion valve control comprises transmitting said signal information relating to operation of said compressor to said expansion valve control from the thermostat.

12. The method of claim 8, wherein said controlling step is performed in a manner controlling the electronic expansion valve in either a heating mode or a cooling mode in automatic response to sensed magnitudes of refrigerant temperature differentials across one of said condenser coil and said evaporator coil.

13. The method of claim 8, further comprising the step of verifying compressor operation prior to operatively controlling the electronic expansion valve.

14. The method of claim 13, further comprising the step of delaying the controlling of the electronic expansion valve until the expiration of a period of time after compressor activation.

* * * * *